(12) United States Patent
Miller et al.

(10) Patent No.: US 9,178,893 B2
(45) Date of Patent: Nov. 3, 2015

(54) SECURE AD HOC COMMUNICATION SYSTEMS AND METHODS ACROSS HETEROGENEOUS SYSTEMS

(75) Inventors: Trent J. Miller, West Chicago, IL (US); Stephen C. Glass, Plantation, FL (US); David E. Klein, Davie, FL (US); Wei Mao, Palatine, IL (US); Francesca Schuler, Palatine, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 779 days.

(21) Appl. No.: 13/444,596

(22) Filed: Apr. 11, 2012

(65) Prior Publication Data

US 2013/0272134 A1   Oct. 17, 2013

(51) Int. Cl.
*H04L 29/06*  (2006.01)
*H04W 76/00* (2009.01)
*H04W 12/02* (2009.01)
*H04W 12/04* (2009.01)
*H04W 84/18* (2009.01)
*H04W 88/06* (2009.01)
*H04W 88/18* (2009.01)

(52) U.S. Cl.
CPC ............ *H04L 63/104* (2013.01); *H04L 63/205* (2013.01); *H04W 12/02* (2013.01); *H04W 12/04* (2013.01); *H04W 76/005* (2013.01); *H04W 84/18* (2013.01); *H04W 88/06* (2013.01); *H04W 88/182* (2013.01)

(58) Field of Classification Search
CPC ....... H04W 4/10; H04W 76/00; H04W 88/06; H04W 84/02; H04W 24/00; H04W 76/005; H04W 84/18; H04W 4/008; H04L 67/1091; H04L 67/1089; H04L 67/104

USPC ........................ 370/241, 328, 338; 455/552.1
See application file for complete search history.

(56) References Cited

U.S. PATENT DOCUMENTS

| | | | |
|---|---|---|---|
| 6,959,203 B2 | 10/2005 | Claxton et al. | |
| 7,146,187 B2 | 12/2006 | Richards et al. | |
| 7,839,856 B2 | 11/2010 | Sinha et al. | |
| 2004/0063451 A1 | 4/2004 | Bonta et al. | |
| 2005/0132166 A1* | 6/2005 | Saffre ............................ 712/26 |

(Continued)

FOREIGN PATENT DOCUMENTS

| | | |
|---|---|---|
| EP | 1705855 A1 | 9/2006 |
| GB | 2410153 A | 7/2005 |
| WO | 2007044597 A2 | 4/2007 |

OTHER PUBLICATIONS

PCT International Search Report Dated July 5, 2013 for Counterpart Application PCT/US2013/034883.

*Primary Examiner* — Noel Beharry
*Assistant Examiner* — Nicole E King
(74) *Attorney, Agent, or Firm* — Kenneth A. Haas; Daniel R. Bestor (57) ABSTRACT

A method for rapid peer-to-peer link establishment among a set of mobile devices includes operating a first second device, advertising system attributes in a wireless beacon by the second device, receiving the system attributes from the wireless beacon at the first device, comparing the system attributes to a service needed by the first device, and, if the second device is compatible based on the comparing, establishing a wireless link by the first device to the second device. A system and wireless device for rapid peer-to-peer link establishment among a set of mobile devices are also described.

20 Claims, 7 Drawing Sheets

(56) References Cited

U.S. PATENT DOCUMENTS

| | | |
|---|---|---|
| 2005/0174962 A1 | 8/2005 | Gurevich |
| 2005/0226189 A1 | 10/2005 | Janneteau et al. |
| 2005/0283610 A1 | 12/2005 | Serret-Avila et al. |
| 2006/0098610 A1* | 5/2006 | Sundberg et al. ............ 370/338 |
| 2007/0115899 A1 | 5/2007 | Ovadia et al. |
| 2007/0150723 A1* | 6/2007 | Estable et al. ............... 713/155 |
| 2007/0184837 A1* | 8/2007 | Hohl et al. ................. 455/435.1 |
| 2008/0192666 A1 | 8/2008 | Koskan et al. |
| 2009/0158041 A1* | 6/2009 | Kang et al. .................. 713/171 |
| 2009/0168685 A1 | 7/2009 | Olivier et al. |
| 2009/0323655 A1 | 12/2009 | Cardona et al. |
| 2010/0056099 A1* | 3/2010 | Kazmi ...................... 455/404.1 |
| 2010/0137015 A1* | 6/2010 | Blanco ......................... 455/518 |
| 2010/0313020 A1* | 12/2010 | Montemurro ................ 713/168 |
| 2011/0070836 A1* | 3/2011 | Park et al. ................... 455/41.2 |
| 2011/0194481 A1* | 8/2011 | Chow et al. ................... 370/312 |
| 2011/0237287 A1 | 9/2011 | Klein et al. |
| 2011/0299685 A1* | 12/2011 | Hall ............................. 380/273 |
| 2013/0103765 A1 | 4/2013 | Papakipos et al. |
| 2013/0157708 A1 | 6/2013 | Economy et al. |
| 2013/0295954 A1* | 11/2013 | Hamalainen et al. ...... 455/456.1 |

* cited by examiner

SECURE AD HOC COMMUNICATION SYSTEMS AND METHODS ACROSS HETEROGENEOUS SYSTEMS

FIELD OF THE DISCLOSURE

The present disclosure relates generally to wireless communications and more particularly to secure and rapid ad hoc communication systems and methods across heterogeneous systems.

BACKGROUND

Wireless communication systems and methods are ubiquitous. In an exemplary embodiment, wireless communications are used for mission critical public safety applications (e.g., first responders including police, fire, emergency medical personnel, etc.). Wireless communication systems have defined wireless coverage, and wireless devices outside of such wireless coverage cannot communicate. Lack of coverage is especially disadvantageous in mission critical applications such as public safety. If there are proximate wireless devices with coverage, it could be possible for collaboration with wireless devices out of coverage to enable such devices to communicate through wireless devices with coverage. For example, Digital Vehicular Repeater System (DVRS) (from Futurecom, Concord, ON, Canada) is a collaboration system using a high power Land Mobile Radio (LMR) device as a proxy for a low power LMR device that cannot access an LMR system directly. This is an example of homogeneous system collaboration, i.e., one LMR device collaborating with another LMR device. Heterogeneous systems include disparate devices, e.g., an LMR device and a broadband device (3G, 4G, LTE, WLAN, etc.) operating together is a heterogeneous system. Accordingly, there is a need for collaboration systems and methods across heterogeneous systems that are secure, rapid, etc. and that can beneficially be applied to mission critical applications such as public safety (LMR).

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein

DETAILED DESCRIPTION

In various exemplary embodiments, the present disclosure provides secure and rapid ad hoc communication systems and methods across heterogeneous systems. In an exemplary embodiment, a method for rapid peer-to-peer link establishment among a set of mobile devices includes operating a first device and a second device, wherein the first device utilizes a first wireless wide area network (WAN) technology and the second device utilizes a second wireless WAN technology; advertising system attributes in a wireless beacon by the second device using a third wireless technology; receiving the system attributes from the wireless beacon at the first device; comparing the system attributes to attributes needed by the first device; and if the second device is compatible based on the comparing, establishing a wireless link by the first device to the second device using the third wireless technology. The method can further include providing a cryptographic key to the first device; and providing the cryptographic key to the second device. The method can further include encrypting the system attributes with the cryptographic key prior to the advertising step; and decrypting at the first device the received system attributes using the cryptographic key. Optionally, the first device and the second device can be operating push to talk, and wherein the system attributes can include talk group affiliation.

The first wireless technology can include a broadband wireless access technology, and wherein the first device can be configured to implement the receiving, comparing, and establishing steps responsive to losing coverage in the broadband wireless access technology. Optionally, the second wireless technology can include Land Mobile Radio (LMR). The wireless link can be established using a personal access network (PAN) technology. The PAN technology can include one of Wireless Local Area Network, Wireless Universal Serial Bus (USB), Ultra wide band, and Bluetooth. The wireless beacon can include a Wireless Local Area Network (WLAN) beacon and the system attributes can be included in Vendor-Specific tags contained therein.

The method can further include, if the second device is not compatible based on the comparing, scanning by the first device for wireless beacons from another wireless device. The second device can be determined to be not compatible prior to the first device establishing the wireless link. The second device can be not compatible based on at least one of system identification, priority level, talk group affiliation, uplink security capability, uplink bandwidth, and current status of the second device. The second device can include a Land Mobile Radio (LMR), and the method can further include advertising the system attributes in the wireless beacon treating the LMR as a wireless Access Point; and accepting a collaboration with the first device to relay data from the first device to the server. The method can further include utilizing the LMR by the first device for relaying a push to talk call; and, if the push to talk call is between LMR devices, relaying the push to talk call in an LMR system to appropriate LMR devices, else relaying the push to talk call to the server. The method can further include monitoring the wireless link at the first device; monitoring wireless beacons of other devices; and switching the wireless link to one of the other devices based on the monitoring of the wireless link and the monitoring wireless beacons of other devices.

In another exemplary embodiment, a system includes a first device utilizing a first wireless wide area network (WAN) technology; at least one second device utilizing a second wireless WAN technology; and a server communicatively coupled to the first device at least in part through the first wireless WAN technology and communicatively coupled to the least one second device at least in part through the second wireless WAN technology; wherein the server is configured to provide a cryptographic key to the first device and the at least one second device; wherein the at least one second device is configured to periodically transmit advertisements using a third wireless technology with system attributes encrypted with the cryptographic key; and wherein, if the first device loses coverage on the first wireless technology, the first device is configured to receive and decrypt the advertisements for collaboration with the at least one second device. The third wireless technology can include a personal area network (PAN) technology common to both the first device and the at least one second device. The advertisements can be sent via a Wireless Local Area Network beacon, and wherein the at least one device can be configured to advertise the system attributes similarly to an Access Point. The system attributes can be provided in Vendor-Specific tags of the Wireless Local Area Network beacon.

In yet another exemplary embodiment, a wireless device includes a first radio configured to operate a first wireless technology; a second radio configured to operate a second wireless technology; a processor communicatively coupled to the first radio and the second radio; and software stored in memory that include instructions executable by the processor, and in response to such execution cause the processor to: receive a key; determine a loss of coverage on the first wireless technology; monitor for advertisements over the second wireless technology; decrypt the advertisements with the key; and find an appropriate peer device based on the advertisements and establish an ad hoc connection with the appropriate peer device.

Figure 1:
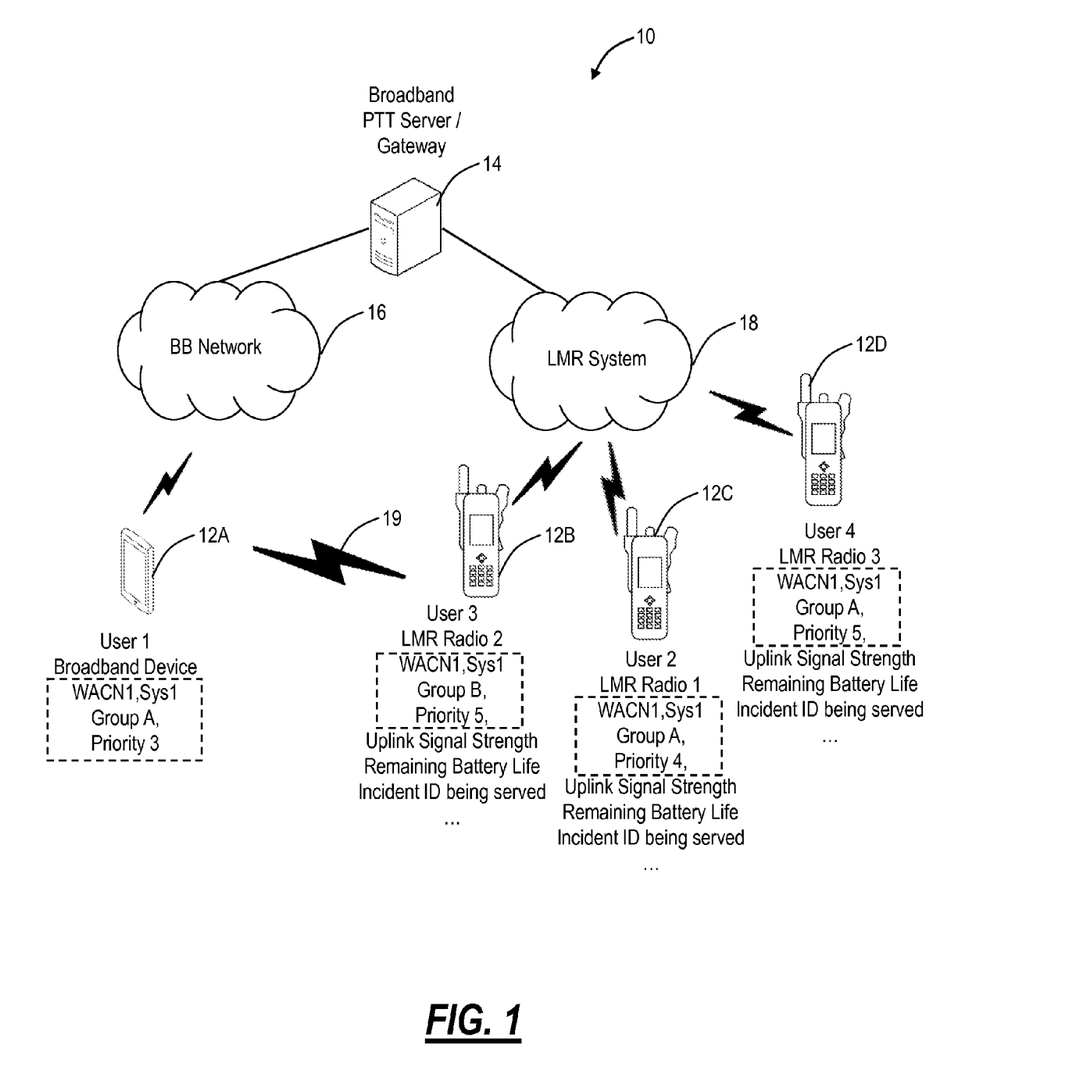
FIG. 1 is a network diagram of a heterogeneous wireless system in accordance with some embodiments.

Referring to FIG. 1, in an exemplary embodiment, a network diagram illustrates a wireless system 10 of a plurality of devices 12. Optionally, the devices 12 can be communicatively coupled to a server 14. In this example, the plurality of users includes broadband device 12A and LMR devices 12B, 12C, 12D, and each of the devices 12A, 12B, 12C, 12D include a mobile wireless device (e.g., such as the mobile device 12 of FIG. 7). The device 12A can be referred to as a broadband user using, e.g., 3G, 4G, Long Term Evolution (LTE), Wireless Local Area Network (WLAN) such as IEEE 802.11 variants, WiMAX such as IEEE 802.16 variants, and the like. The device 12A is configured to communicate to the server 14 through a broadband network 16, and the devices 12B, 12C, 12D are configured to communicate to the server 14 through an LMR system 18. Note, in this example, LMR and broadband are used as exemplary disparate systems for a heterogeneous system, and those of ordinary skill in the art will recognize other types of systems are also contemplated herein. Thus, the wireless system 10 is a heterogeneous system where the first device 12A uses a different access technology as the devices 12B, 12C, 12D.

The example of FIG. 1 includes the single broadband device 12A and one or more LMR devices 12B, 12C, 12D in a same vicinity of an incident. For example, assume the server 14 is a push-to-talk (PTT) system in which all of the devices 12A, 12B, 12C, 12D participates. The server 14 can be part of the LMR system 18 or communicatively coupled to a PTT server within the LMR system 18. In context of the ad hoc communication systems and methods, the broadband device 12A is out of coverage (e.g., out of range or coverage of the broadband network 16), but the broadband device 12A requires connectivity to the server 14 (or just network access). For example, assume the broadband device 12A requires connectivity to the server to initiate a PTT call into the LMR system. With the ad hoc communication systems and methods, the broadband device 12A can use a personal access network (PAN) 19 technology to rapidly and securely connect to one of the devices 12B, 12C, 12D for network connectivity. The PAN technology can include, for example, WiFi, WLAN, Bluetooth, Wireless Universal Serial Bus (USB), Ultra Wide Band, and the like. In various exemplary embodiments described herein, the PAN 19 technology is illustrated as WiFi (or WLAN or any IEEE 802.11 variant), and those of ordinary skill in the art will recognize any type of PAN technology or equivalent is contemplated for the ad hoc communication systems and methods.

While recognizing the broadband device 12A is out of coverage, the device 12A automatically uses the PAN 19 to query the nearby LMR devices 12B, 12C, 12D of their system affiliation, capabilities, availability, etc. Importantly, rather than make the broadband device 12A establish a link to each potential LMR device 12B, 12C, 12D and then discover the LMR device 12B, 12C, 12D is not suitable (e.g., wrong talkgroup, etc.), the ad hoc communication systems and methods allow the broadband device 12A to decode encrypted application information advertised by the LMR devices 12B, 12C, 12D and connect immediately to the "best" LMR device 12B, 12C, 12D in the area. Advantageously, the ad hoc communication systems and methods greatly reduce the time necessary to find a suitable collaborator. In other words, a link does not need to be established by the broadband device 12A to the LMR devices 12B, 12C, 12D in order to discover key uplink information offered by the LMR devices 12B, 12C, 12D.

In operation, the LMR devices 12B, 12C, 12D advertise system attributes (e.g., available applications, home/visited system identifiers, current PTT talk group usage, device capabilities (battery life remaining, signal strength to/from LMR System, etc.), utilization/available capacity, current incident being served, etc.) using the PAN 19 technology. The broadband device 12A, upon determining lack of coverage and having examined the advertised system attributes from the LMR devices 12B, 12C, 12D, can establish a secure connection to one of the LMR devices 12B, 12C, 12D. Using the advertised system attributes, the one of the LMR devices 12B, 12C, 12D and the broadband device 12A can arbitrate a connection and access details based upon shared security elements. Once this arbitration is complete, the broadband device 12A and LMR device can share resources as defined by agreed upon access levels. These agreed upon access levels can include, for example, the LMR device being a proxy for a PTT call from the broadband devices 12A. Also, the agreed upon access levels can include the broadband devices 12A directing the LMR device to specific operating modes allowing the broadband devices 12A device to communicate with LMR groups. Advantageously, this approach allows a user out of coverage to share LMR resources with capable LMR users without having to be pre-provisioned due to the shared security model of the LMR system.

While illustrated in FIG. 1 with the broadband device 12A connecting to one of the LMR devices 12B, 12C, 12D, those skilled in the art will realize the roles of broadband device 12A, and LMR device 12B, 12C, 12D may be reversed. For example, the broadband device 12A may advertise system attributes for the one of the LMR devices 12B, 12C, 12D to utilize via the PAN 19. Also, FIG. 1 illustrates the devices 12A, 12B, 12C, 12D commonly connected to the server 14. Those of ordinary skill in the art will recognize the devices 12A, 12B, 12C, 12D do not need to communicate to the common server 14. That is, the device 12A can use one of the devices 12B, 12C, 12D (or vice versa) for any network-based application, and not solely limited to PTT. At a minimum as is described herein, the devices 12A, 12B, 12C, 12D require some commonality in that the devices 12A, 12B, 12C, 12D know to look for advertisements from peer devices responsive to loss of coverage. This commonality can also include having appropriate decryption keys.

Figure 2:
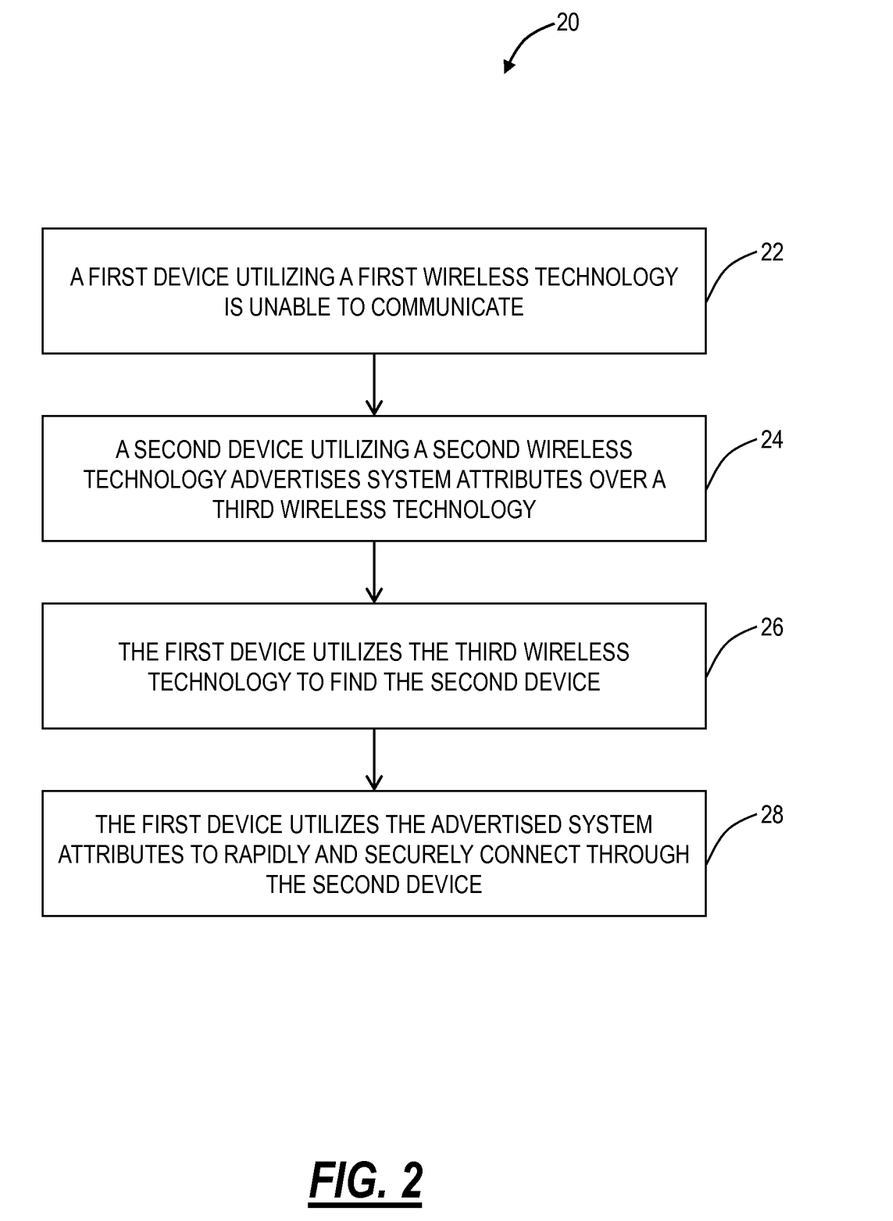
FIG. 2 is a flowchart of a secure ad hoc communication method in accordance with some embodiments.

Referring to FIG. 2, in an exemplary embodiment, a flowchart illustrates a secure ad hoc communication method 20 between two devices. For example, the communication method 20 can be viewed as a generalized method relative to the description of the system 10 in FIG. 1. The method 20 is implemented by two wireless devices, a first device and a second device. For example, the method 20 can be implemented in the system 10 with the first device being the broadband device 12A and the second device being one of the LMR devices 12B, 12C, 12D. The first device utilizes a first wireless wide area network (WAN) technology and the second device utilizes a second wireless WAN technology. Collectively, the first device and the second device each utilize a third wireless technology that enables secure and rapid collaboration between the devices, e.g. the PAN technology. The method 20 can utilize security certificates across different networks with a common presence notification solution to enable secure on scene ad hoc networking capabilities. First, the first device utilizing the first wireless WAN technology is unable to communicate (step 22). For example, the first device could be out of range or coverage. The first wireless WAN technology can be any wireless network access protocol such as, for example, 3G (e.g., Universal Mobile Telecommunications System (UMTS) and variants thereof, Code division multiple access (CDMA) and variants thereof, Global System for Mobile Communications (GSM) and variants thereof, etc.), 4G (e.g., LTE and variants thereof, etc.), WiMAX and variants thereof, IEEE 802.16 and variants thereof, Evolved High-Speed Packet Access (HSPA+) and variants thereof, Evolution-Data Optimized (EVDO) and variants thereof, etc. In an exemplary embodiment, the first wireless WAN technology is one offered by a wireless service provider commercially to the first user with the first user's device being a cell phone, smart phone, tablet, personal digital assistant (PDA), etc.

In an exemplary embodiment, the first device being unable to communicate can be in context with the first user arriving at an incident or any location, and the first device can be needed for a user to communicate in regards to the incident. For example, the user can be a first responder, and the first device can be used for the user to acquire assignments, to provide details to other first responders, etc. In such contexts, it is important that the user be always connected, i.e., mission critical, and in absence of connection, to find a connection quickly and efficiently. The method 20 has a second device utilizing a second wireless WAN technology that advertises system attributes over a third wireless technology (step 24). In context, the second device can belong to another user also at the incident or in proximity to the first device. Again, the second wireless WAN technology can be any wireless network access protocol such as, for example, 3G and variants thereof, 4G and variants thereof, WiMax and variants thereof, IEEE 802.16 and variants thereof, HSPA+ and variants thereof, EVDO and variants thereof, Land Mobile Radio (LMR), TIA Project 25, TETRA, Trunked LMR, Conventional (non-trunked) LMR, Wireless Medical Telemetry Service (WMTS), etc. Note, the first wireless WAN technology and the second wireless WAN technology can be the same type or different. For example, if these technologies are the same type, they could be different provider networks.

The third wireless technology is common to both the first device and the second device. That is, the first device will use the third wireless technology to collaborate with the second device such that the first device can communicate despite being out of coverage on the first wireless technology. The third wireless technology can be a PAN technology such as, for example, WiFi, WLAN, Bluetooth, Wireless USB, Ultra Wide Band, or some other wireless access technology. In the method 20, the second device is configured to advertise system attributes over the third wireless technology. Conversely, the first device utilizes the third wireless technology to find the second device (or another more compatible device) (step 26). Specifically, upon detecting lack of coverage, the first device is configured to search, using the third wireless technology, for a peer to collaborate with. Simultaneously, the second device is configured to advertise its system attributes using the third wireless technology.

The advertisements from the second device serve two purposes, 1) to enable the first device to determine appropriate matches for collaboration without establishing a connection, and 2) to enable the first device to rapidly and securely obtain an ad hoc connection with the second device. First, the advertisements avoid the requirement that the first device establish a connection before determining whether the second device is an appropriate match. This saves time and avoids wasted connections. Second, the first device uses the advertisement data to rapidly set up the connection with the second device in an automated fashion. Additionally, the advertisements can include security credentials that the first device can use to decode/decrypt the system attributes of the second device. Also, the first and second devices may each include a common cryptographic key or the like used to decrypt the advertisements. For example, the cryptographic key could be pre-installed allowing only certain devices to detect the advertisements.

The second device can advertise its system attributes using a beacon. In an exemplary embodiment, the beacon can be part of the second wireless WAN technology, e.g. a LMR collaborative link beacon. In another exemplary embodiment, the beacon can be part of the third wireless technology, e.g. a WLAN beacon. The advertisements are part of the beacon and can only be decoded by devices with a suitable security credentials, for example. The WLAN beacon can include the advertisements in Vendor-Specific tags thereby preserving the IEEE 802.11 standard and treating the advertising device like an Access Point. In yet another exemplary embodiment, the beacon can be a proprietary wireless beacon solely used in the system 10 between the devices 12 for the purposes of advertising system attributes to proximate peers. In Ultra Wide Band, the system attributes can be advertised using a private reservation process used to include vendor specific data during broadcasts. In wireless USB, beaconing can be accomplished via the vendor specific Base Class FFh reserved for inclusion of specific vendor data without violation of the standard. The advertisements could also extend to newly developed PAN technologies as well as near-me area network (NAN) concepts being developed. Conceptually, these advertisements can be viewed as providing higher level attributes at a lower level. For example, Layer 4-7 attributes can be advertised at Layer 2 (WLAN).

The first device utilizes the advertised system attributes to rapidly and securely connect through the second device (step 28). For example, the advertised system attributes can include system identification, priority level, available application(s), talk group number, indication of scan mode versus affiliated talk group, uplink bandwidth, uplink security capability, indication of polite or impolite talk group access, current status of the second device (such as battery life available and WAN signal strength), etc. In the example of FIG. 1, the broadband device 12A, i.e., the first device, is part of a system denoted as WACN1, Sys1, and the broadband device 12A is part of Group A at priority 3 to the server 14. Each of the LMR devices 12B, 12C, 12D is part of the same system, WACN1, Sys1. The device 12B is part of Group B at a priority 5, the device 12C is part of the Group A at priority 4, and the device 12D is part of the Group A at priority 5. This aforementioned information can be part of the advertised system attributes by each of the devices 12B, 12C, 12D. Additionally, each of the devices 12B, 12C, 12D can advertise other information such as uplink signal strength, availability, bandwidth usage, etc. From the advertised system attributes, the first device 12A can determine which device 12B, 12C, 12D is optimal to collaborate with prior to establishing a wireless link. Once connected, the first device can use the second device for connectivity such as for PTT, network access, telephony, etc.

The first wireless WAN technology and the second wireless WAN technology can be said to be heterogeneous as described herein in that they are different technologies. The communication systems and methods across heterogeneous systems make use of the fact that conventional wireless devices usually include the PAN technology in addition to the first or second wireless WAN technology. That is, smart phones, tablets, radios, etc. all typically include WLAN and Bluetooth, for example. It is thought this common PAN technology, that the communication systems and methods across heterogeneous systems can bridge the disparate first and second wireless WAN technologies to enable collaboration there between. The communication systems and methods can further enable this collaboration by using a shared pre-defined encryption mechanism as well as providing conformity to the PAN standards by using standard compliant advertisement mechanisms.

Figure 3:
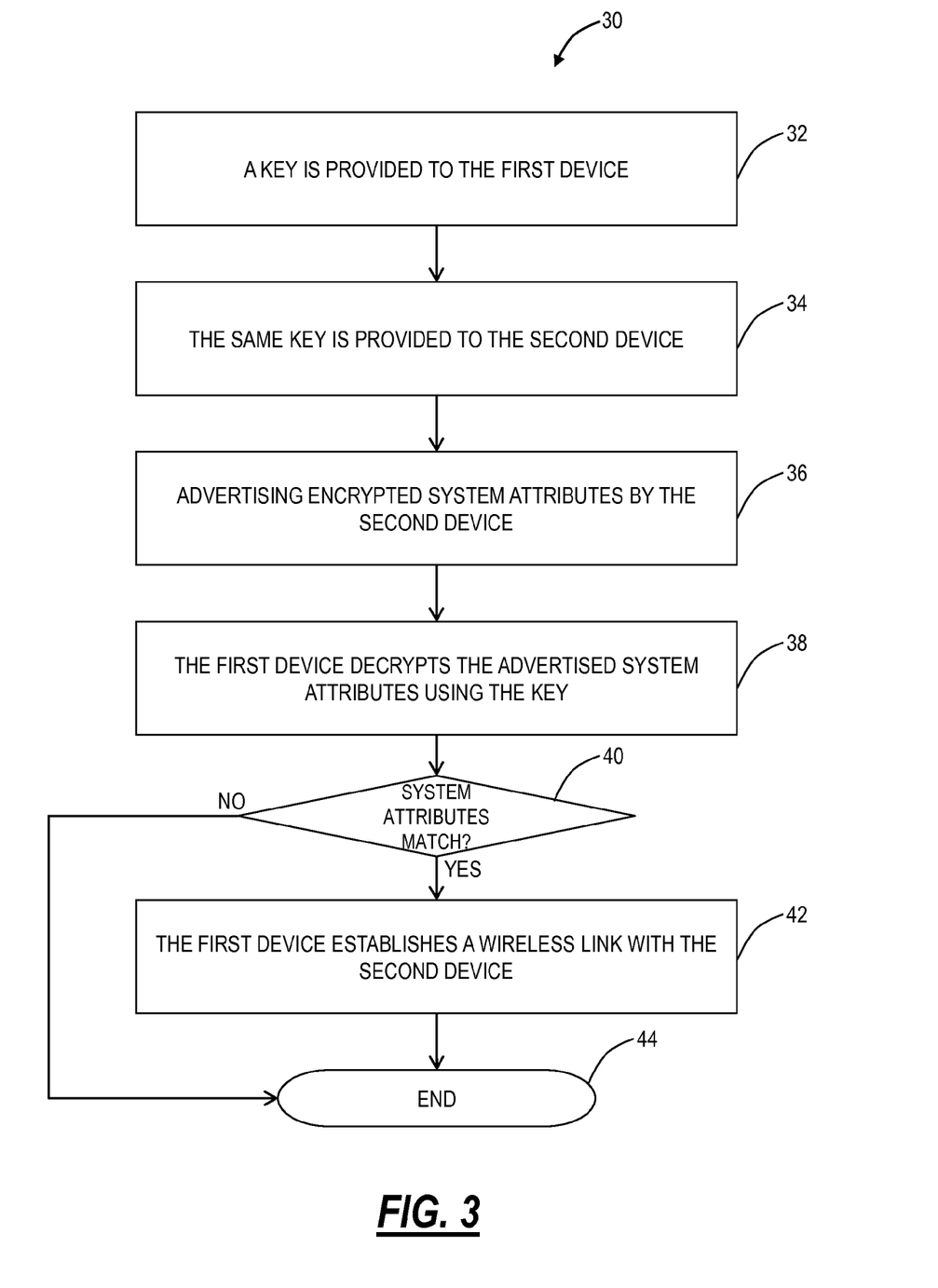
FIG. 3 is a flowchart of another secure ad hoc communication method between two devices and a server in accordance with some embodiments.

Referring to FIG. 3, in an exemplary embodiment, a flowchart illustrates another secure ad hoc communication method 30 between two devices and a server. The method 30 can be complementary with the method 20, and is generally implemented by two wireless devices and optionally with one or more servers. For example, the method 30 can be implemented in the system 10 with the first device being the broadband device 12A, the second device being one of the LMR devices 12B, 12C, 12D, and the one or more servers being the server 14. Similar to the method 20, the method 30 assumes the first device and the second device use different access technologies, but can be commonly connected via a PAN technology and, optionally commonly connected to a same server (or group of servers). First, a key is provided to the first device (step 32). For example, the key can be sent to the first device from the server via the first wireless WAN technology, downloaded to the first device during a setup procedure, manually keyed into the first device, etc. That is, the key can be provided to the first device using any means known in the art both wireless and wired. The key can be a cryptographic key or the like. The same key is provided to the second device (step 34). Again, the key can be provided to the second device using any known technique. The second device advertises its system attributes with encryption using the key (step 36). The first device decrypts the advertised system attributes of the second device using the key (step 38). The first device compares the system attributes to its needs to determine if there is a match with the second device (step 40). If there is a match, the first device establishes a wireless link with the second device (step 42), and the method ends (step 44). If there is not a match, the method ends (step 44), and optionally the first device looks for another device to collaborate with.

In an exemplary embodiment, the first device and the second device are operating a common application and in communication with the server. For example, the common application can include PTT. The specific base protocol of peer-to-peer PTT interworking can vary including Open Mobile Alliance (OMA) Push to Talk over Cellular (PoC), inter-radio frequency subsystem interface (ISSI), Project 25 over IP (P25oIP) or other PTT protocols. Other common applications are also contemplated by the ad hoc communication systems and methods. The key distribution steps in the method 30 can be performed at any time such as whenever the devices are connected to the server 14, when the devices are manufactured, when the devices are initially set up, etc. For example, upon connection to the server 14, the server 14 can send appropriate keys to the devices. In another exemplary embodiment, the first device and the second device do not have to operate any common applications or be in communication with the server 14. For example, the first device can simply use the second device to obtain network connectivity at a location where the first device has no coverage.

Figure 4:
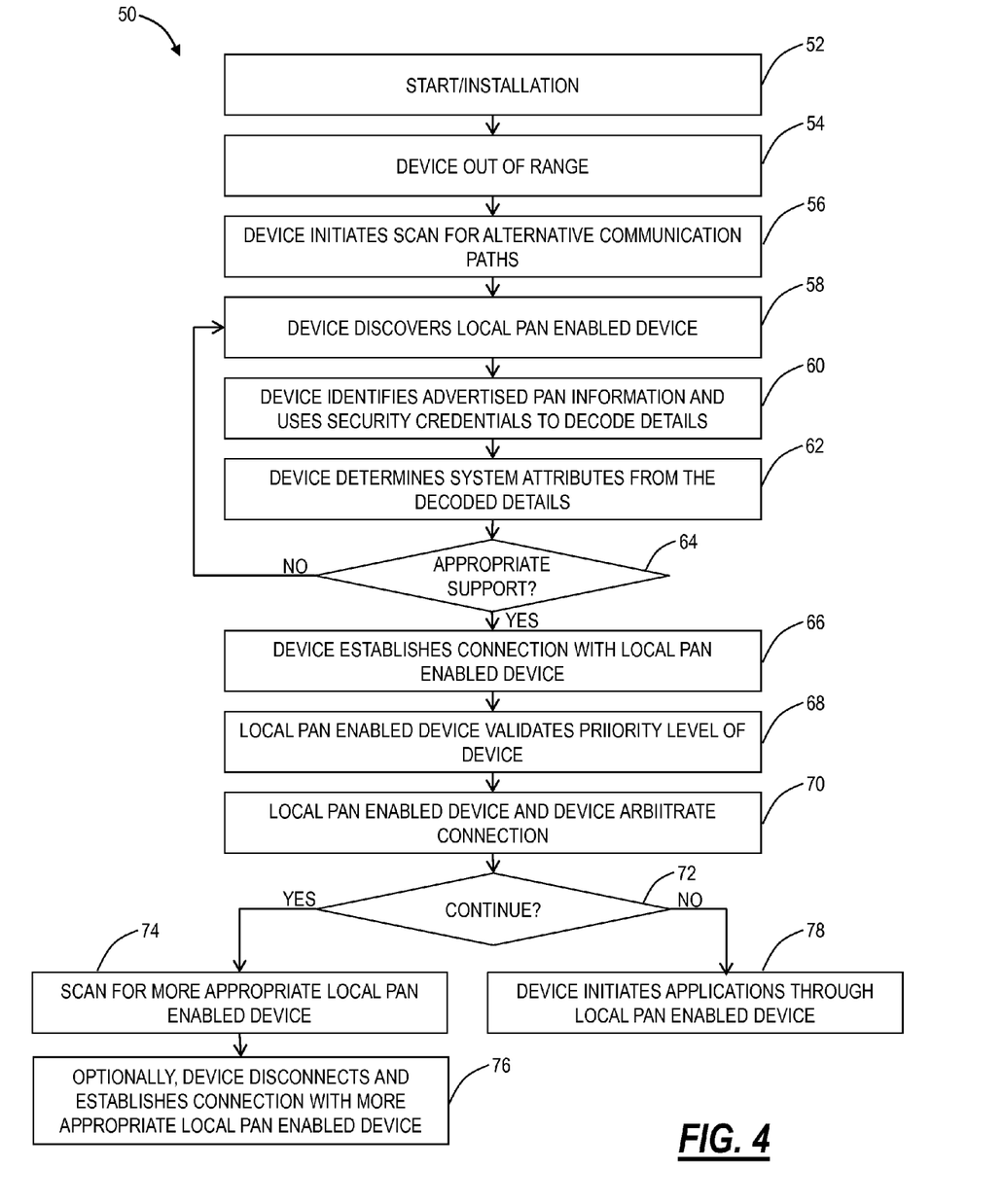
FIG. 4 is a flowchart of yet another secure ad hoc communication method 50 between two devices and a server in accordance with some embodiments.

Referring to FIG. 4, in an exemplary embodiment, a flowchart illustrates another secure ad hoc communication method 50 between two devices and a server. Again, the method 50 can be complementary with the other methods 20, 30, and is generally implemented by at least two wireless devices and optionally by one or more servers. For example, the method 50 can be implemented in the system 10 with the first device being the broadband device 12A, the second device being one of the LMR devices 12B, 12C, 12D, and the one or more servers being the server 14. The method 50 starts with installation of keys, certificates, or other security credentials on the devices (step 52). For example, the server 14 can send appropriate security certificates to each of the devices 12 via their respective access technologies. That is, the method 50 assumes devices/radios from the same agency or organization can have a shared encryption certificates and some level of mutual authentication and authorization occurs using the method 50 to establish peer-to-peer connections between devices and radios. Thus, the devices sharing the same key are based in part on them belonging to users in a same organization, department, unit, etc.

A device is out of range (step 54). For example, the broadband device 12A can arrive at an incident and discover it is not able to communicate on the broadband network 16. The device initiates a scan for alternative communication paths (step 56). This can include looking for beacons with advertised system attributes which are optionally encrypted using the keys, certificates, or other security credentials. The device discovers a local PAN enabled device (step 58). The device can utilize the keys, certificates, or other security credentials to decode details of the advertised system attributes from advertised PAN information (step 60), and the device can determine the system attributes from the decoded details (step 62). These system details, as described herein, determine whether or not the local PAN enabled device is a suitable collaborative partner without requiring link establishment (step 64). For example, the system details include system identification, priority level, talk group, and the like. The device 12A can detect the multiple LMR devices 12B, 12C, 12D, and the device 12A can examine the advertised information before connecting to any of the LMR devices 12B, 12C, 12D, and selecting one with the best uplink and/or collaborative Radio Frequency (RF) signal—this will allow rapid identification of suitable LMR radios in the area. That is, the LMR devices 12B, 12C, 12D share their system information and other attributes securely with the device 12A and the device 12A can decode and evaluate if a particular LMR device is an appropriate device.

If the device does not determine a suitable match (step 64), the device can return to discover another local PAN enabled device (step 58). If the device determines a suitable match (step 64), the device establishes a connection with the local PAN enabled device (step 66). That is, if attributes are acceptable, the device will perform a handshake procedure that may include user role/priority exchanges and application/group level policy negotiations. For example, the device 12A may determine the device 12C or the device 12D is a suitable match, and establish a link there between. The local PAN enabled device validates a priority level of the device (step 68). For example, the local PAN enabled device could utilize local priority knowledge, have priority level shared directly from the device, or retrieve it from the server. Alternatively, this could be embedded in security certificate. The local PAN enabled device and the device arbitrate a connection (step 70). Upon successful arbitration, the device would be able to utilize the local PAN enabled device as a proxy for feature such as PTT operation. For example, assume the device 12A connects with the device 12C, the device 12C will forward PTT calls to/from the device 12A in accordance with the role/priority levels shared during arbitration.

With a successful connection, the device can optionally continue to look for a more appropriate device, e.g. based on the system attributes (step 72). The device can continue to look for a more appropriate device (i.e., different role/priority details or other attributes) (step 74). If found, the device can disconnect and establish a new connection with a more appropriate local PAN enabled device (step 76). If the device does not look for a more appropriate device, the device can initiate applications through the local PAN enabled device (step 78). Additionally, there can be an ongoing arbitration of the connection. For example, when one of the LMR devices 12B, 12C, 12D changes operating modes, it can inform the device 12A so that the device 12A can re-evaluate the appropriateness of the LMR radio.

Figure 5:
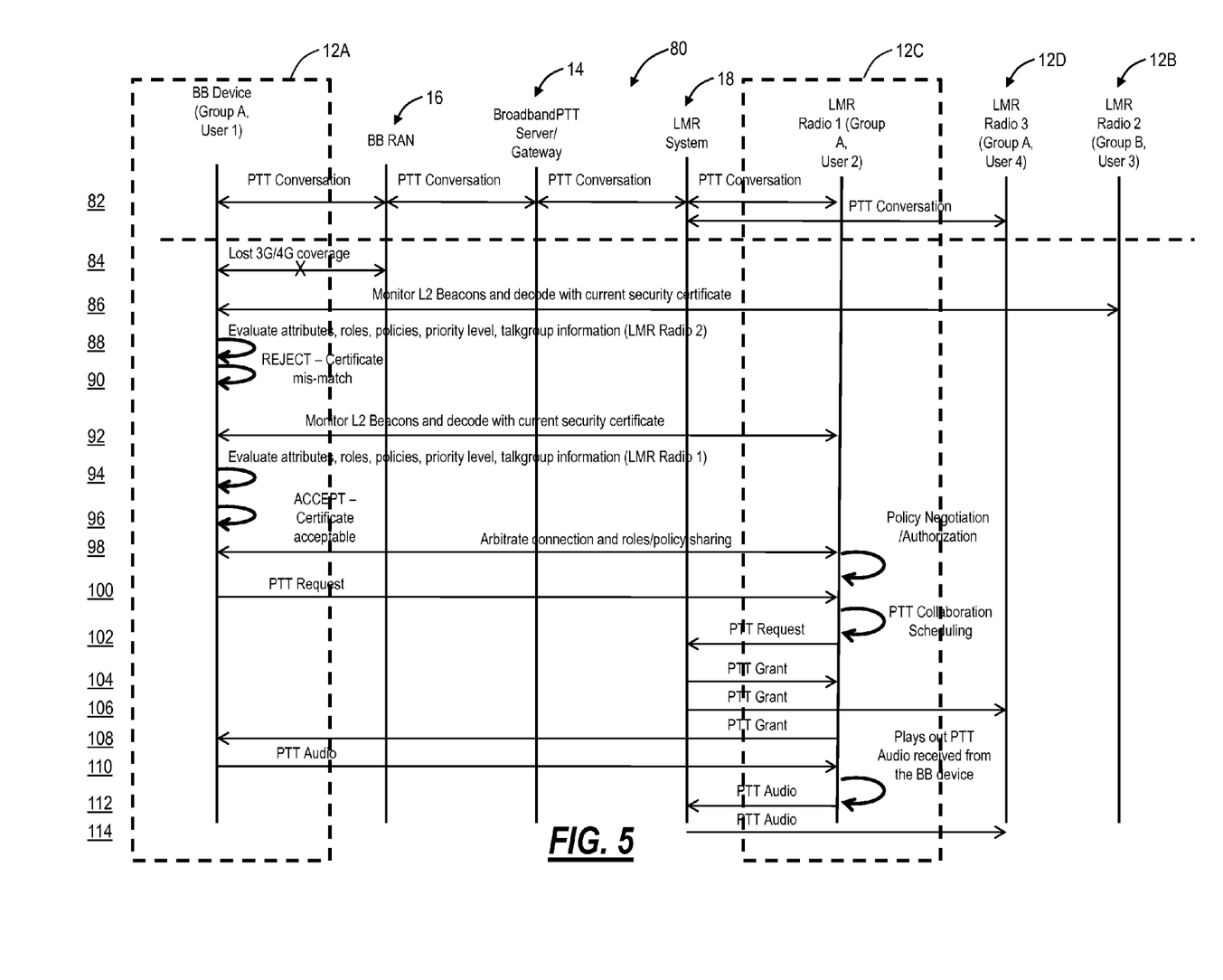
FIG. 5 is a flow diagram illustrates an exemplary operation of the secure ad hoc communication methods in the system of FIG. 1 in accordance with some embodiments.

Referring to FIG. 5, in an exemplary embodiment, a flow diagram illustrates an exemplary operation 80 of the methods 20, 30, 50 in the system 10. Initially, the devices 12A, 12C, 12D are engaged in PTT conversations with the server 14 (step 82). Specifically, the device 12A uses the broadband network 16 and the devices 12C, 12D use the LMR system 18. The device 12A loses coverage (step 84). For example, the device 12A is a cellular device losing 3G/4G coverage. The device monitors beacons and decodes associated data with a current security certificate (step 86). First, the device 12A obtains a beacon from the device 12B. For example, the beacons can be Layer 2 WiFi beacons. The device 12A, from decoded data, evaluates attributes, roles, policies, priority level, talk group information, etc. from the device 12B (step 88). However, since the device 12B is in a different group from the device 12A, the device 12A has a certificate mismatch with the device 12B and rejects this possible match (step 90). The device 12A can either fail to decode the device 12B's beacon information or successfully decode the beacon information and determine the different group membership.

Again, the device 12A monitors beacons, receiving a beacon from the device 12C (step 92). Again, the device 12A, from decoded data, evaluates attributes, roles, policies, priority level, talk group information, etc. from the device 12C (step 94), and the device 12A determines the device 12C is an acceptable match (step 96). The devices 12A, 12C arbitrate a connection and roles/policy sharing information (step 98). With the connection established, the device 12A has a PTT request to device 12D which is sent to the device 12C (step 100). The device 12C sends the PTT request to the LMR system 18 (step 102). The LMR system 18 sends a PTT grant to the device 12C (step 104), to the device 12D (step 106), and to the device 12A (step 108). Note, the PTT request/grant does not need to go to the server 14 since it is entirely contained in the LMR system 18. Next, the device 12A provides PTT audio to the device 12C (step 110) which sends it to the LMR system 18 (step 112) which sends it to the device 12D (step 114).

In an exemplary embodiment, the beacons can be Layer 2 WiFi/WLAN beacons. A Beacon frame is one of the management frames in IEEE 802.11 based WLANs. It contains all the information about the network. Beacon frames are transmitted periodically to announce the presence of a Wireless LAN network. The ad hoc communication systems and methods use these beacons at the devices 12B, 12C, 12D to announce their presence to the device 12A. The WLAN beacon frame includes specific sections referred to Vendor-Specific Tags in which proprietary data can be included such as the encrypted advertised system attributes. Specifically, the ad hoc communication systems and methods treat the devices 12B, 12C, 12D as WLAN Access Points (APs) with the system attributes advertised in the Vendor-Specific Tags. Advantageously, this enable full compliance to the WLAN standards while supporting this additional advertisement functionality for the devices 12B, 12C, 12D.

Figure 6:
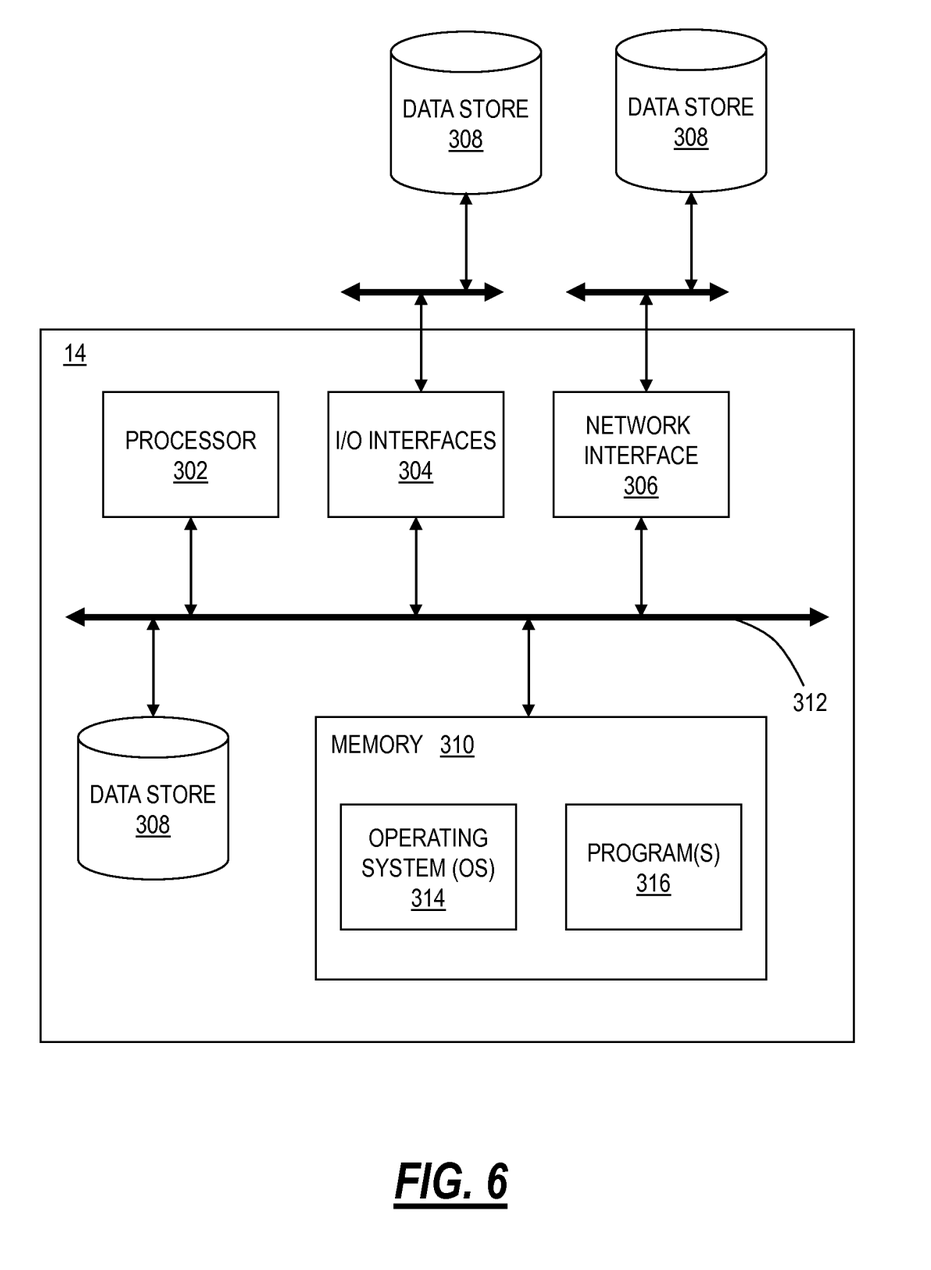
FIG. 6 is a block diagram of a server for use in the system of FIG. 1 and the methods of FIGS. 2-5 in accordance with some embodiments.

Referring to FIG. 6, in an exemplary embodiment, a block diagram illustrates a server 14 for the system 10. The server 14 can be a digital computer that, in terms of hardware architecture, generally includes a processor 302, input/output (I/O) interfaces 304, a network interface 306, a data store 308, and memory 310. It should be appreciated by those of ordinary skill in the art that FIG. 6 depicts the server 14 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 can include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the server 14, a semiconductor-based microprocessor (in the form of a microchip or chip set), or generally any device for executing software instructions. When the server 14 is in operation, the processor 302 is configured to execute software stored within the memory 310, to communicate data to and from the memory 310, and to generally control operations of the server 14 pursuant to the software instructions. The I/O interfaces 304 can be used to receive user input from and/or for providing system output to one or more devices or components. User input can be provided via, for example, a keyboard, touch pad, and/or a mouse. System output can be provided via a display device and a printer (not shown). I/O interfaces 304 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 can be used to enable the server 14 to communicate on a network, such as the broadband network 16 and the LMR system 18. The network interface 306 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 can include address, control, and/or data connections to enable appropriate communications on the network. A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the server 14 such as, for example, an internal hard drive connected to the local interface 312 in the server 14. Additionally in another embodiment, the data store 308 can be located external to the server 14 such as, for example, an external hard drive connected to the I/O interfaces 304 (e.g., SCSI or USB connection). In a further embodiment, the data store 308 can be connected to the server 14 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 can incorporate electronic, magnetic, optical, and/or other types of storage media. Note that the memory 310 can have a distributed architecture, where various components are situated remotely from one another, but can be accessed by the processor 302. The software in memory 310 can include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein. For example, the programs 316 can be configured to enable the methods 20, 30, 50 such as distributing keys or other security credentials, performing applications between the devices 12, etc.

Figure 7:
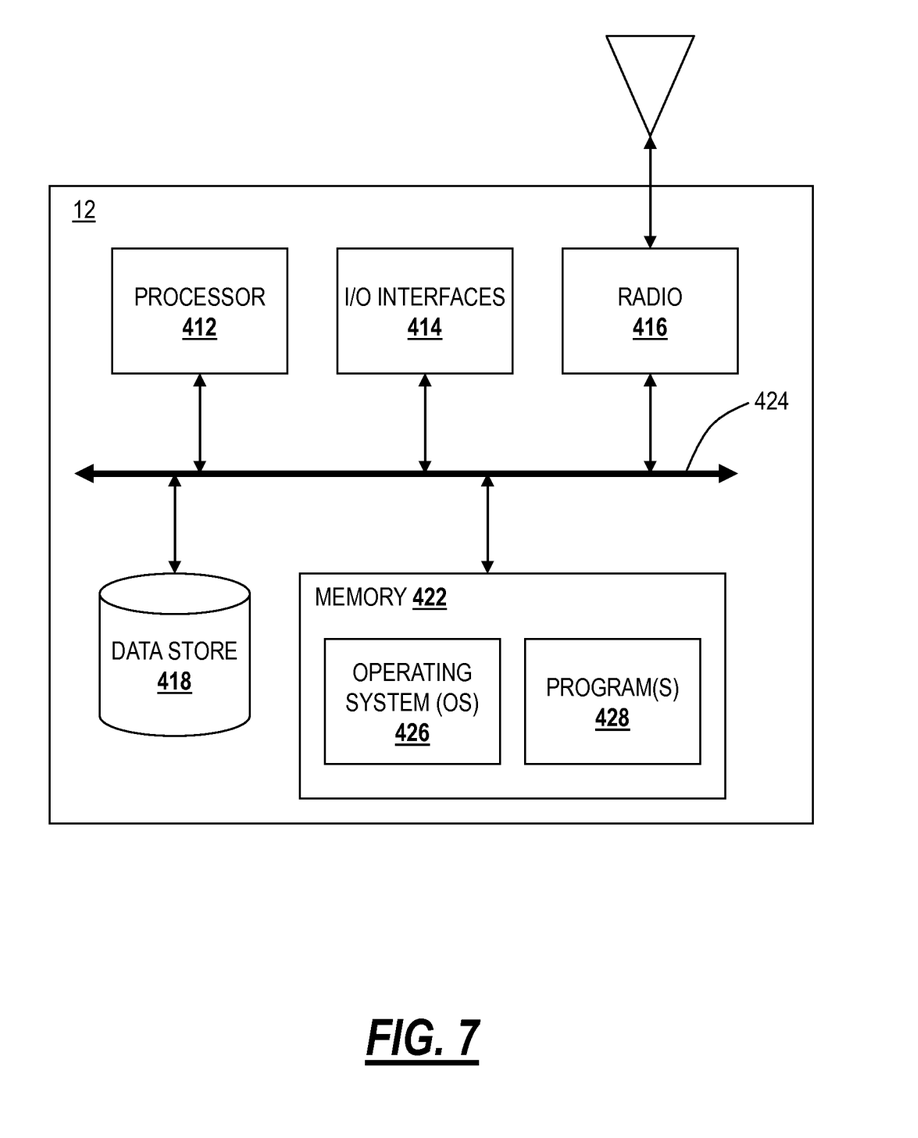
FIG. 7 is a block diagram of a device for use in the system of FIG. 1 and the methods of FIGS. 2-5 in accordance with some embodiments.

Referring to FIG. 7, in an exemplary embodiment, a block diagram illustrates a mobile device 12, which can be used in the system 10 or the like. The mobile device 12 can be a digital device that, in terms of hardware architecture, generally includes a processor 412, input/output (I/O) interfaces 414, a radio 416, a data store 418, and memory 422. It should be appreciated by those of ordinary skill in the art that FIG. 7 depicts the mobile device 12 in an oversimplified manner, and a practical embodiment can include additional components and suitably configured processing logic to support known or conventional operating features that are not described in detail herein. The components (412, 414, 416, 418, and 422) are communicatively coupled via a local interface 424. The local interface 424 can be, for example but not limited to, one or more buses or other wired or wireless connections, as is known in the art. The local interface 424 can have additional elements, which are omitted for simplicity, such as controllers, buffers (caches), drivers, repeaters, and receivers, among many others, to enable communications. Further, the local interface 424 may include address, control, and/or data connections to enable appropriate communications among the aforementioned components.

The processor 412 is a hardware device for executing software instructions. The processor 412 can be any custom made or commercially available processor, a central processing unit (CPU), an auxiliary processor among several processors associated with the mobile device 12, a semiconductor-based microprocessor (in the form of a microchip or chip set), or generally any device for executing software instructions. When the mobile device 12 is in operation, the processor 412 is configured to execute software stored within the memory 422, to communicate data to and from the memory 422, and to generally control operations of the mobile device 12 pursuant to the software instructions. In an exemplary embodiment, the processor 412 may include a mobile optimized processor such as optimized for power consumption and mobile applications. The I/O interfaces 414 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 414 can also include, for example, a serial port, a parallel port, a small computer system interface (SCSI), an infrared (IR) interface, a radio frequency (RF) interface, a universal serial bus (USB) interface, and the like. The I/O interfaces 414 can include a graphical user interface (GUI) that enables a user to interact with the mobile device 12. Additionally, the I/O interfaces 414 may further include an imaging device, i.e. camera, video camera, etc.

The radio 416 enables wireless communication to an external access device or network. Any number of suitable wireless data communication protocols, techniques, or methodologies can be supported by the radio 416, including, without limitation: RF; LMR; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 418 can be used to store data. The data store 418 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 418 can incorporate electronic, magnetic, optical, and/or other types of storage media.

The memory 422 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 422 may incorporate electronic, magnetic, optical, and/or other types of storage media. Note that the memory 422 can have a distributed architecture, where various components are situated remotely from one another, but can be accessed by the processor 412. The software in memory 422 can include one or more software programs, each of which includes an ordered listing of executable instructions for implementing logical functions. In the example of FIG. 7, the software in the memory system 422 includes a suitable operating system (O/S) 426 and programs 428. The operating system 426 essentially controls the execution of other computer programs, and provides scheduling, input-output control, file and data management, memory management, and communication control and related services. The programs 428 can include various applications, add-ons, etc. configured to provide end user functionality with the mobile device 12. For example, exemplary programs 428 can include, but not limited to, a web browser, social networking applications, streaming media applications, games, mapping and location applications, electronic mail applications, financial applications, and the like.

The devices 12A, 12B, 12C, 12D can each be similar to the device 12 of FIG. 7. Of course, the radio 416 and other components include differing configurations for different access technologies (e.g., 3G/4G vs. LMR). Also, the devices 12A, 12B, 12C, 12D can include multiple radios. For example, the device 12A could include a radio for access to the broadband network 16 and a radio for WiFi. The devices 12B, 12C, 12D could include a radio for access to the LMR system and a radio for WiFi, etc. The programs 428 can also include functionality for each of the devices 12A, 12B, 12C, 12D to implement the methods 20, 30, 50 described herein. In an exemplary embodiment, the second device or the devices 12B, 12C, 12D could include user interface enhancements which show currently paired devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for rapid peer-to-peer link establishment among a set of mobile devices, the method comprising:
operating a first device, wherein the first device utilizes a first wireless wide area network (WAN) technology to access a first WAN;
detecting, by the first device, a lack of network connectivity with the first WAN, and responsively:
monitoring for and receiving, at the first device, advertised system attributes in a plurality of wireless beacons from respective second devices using a third wireless technology, the advertised system attributes setting forth attributes of the respective second device with respect to second device operation using a second wireless WAN technology to access a second WAN;
comparing, by the first device, the advertised system attributes to attributes needed by the first device; and
selecting, by the first device, advertised system attributes associated with a particular second device best matching the attributes needed by the first device, and establishing a wireless link by the first device to the particular second device using the third wireless technology.

2. The method of claim 1, further comprising:
providing a cryptographic key to the first device; and
using, by the first device, the cryptographic key to decrypt system attributes received from the particular second device.

3. The method of claim 2, wherein the first device and the particular second device are operating push to talk, and wherein the advertised system attributes comprise talk group affiliation.

4. The method of claim 2, wherein the first wireless WAN comprises a broadband WAN; and
wherein the second wireless WAN comprises a Land Mobile Radio (LMR) WAN.

5. The method of claim 2, wherein the wireless link is established using a personal access network (PAN) technology comprising one of Wireless Local Area Network, Wireless Universal Serial Bus (USB), Ultra wide band, and Bluetooth.

6. The method of claim 2, wherein the particular second device comprises a Land Mobile Radio (LMR) device, the method further comprising:
advertising the advertised system attributes in the wireless beacon treating the LMR device as a wireless Access Point; and
accepting a collaboration with the first device to relay data from the first device to a server.

7. The method of claim 6, further comprising:
utilizing the LMR device by the first device for relaying a push to talk call; and
if the push to talk call is between LMR devices, relaying the push to talk call in an LMR system to appropriate LMR devices, else relaying the push to talk call to the server.

8. The method of claim 1, wherein each wireless beacon of the plurality of wireless beacons comprises a Wireless Local Area Network (WLAN) beacon and the advertised system attributes are included in Vendor-Specific tags contained therein.

9. The method of claim 1, further comprising:
if the particular second device is no longer compatible based on a second comparing with revised advertised system attributes received from the particular second device, selecting, by the first device, another second wireless device.

10. The method of claim 1, further comprising:
monitoring the wireless link at the first device;
monitoring wireless beacons of the other second devices; and
switching the wireless link to one of the other second devices based on the monitoring of the wireless link and the monitoring of the wireless beacons of the other second devices.

11. The method of claim 1, wherein the advertised system attributes set forth one or more of a system identification of the second wireless WAN, a priority level of the second device in the second wireless WAN, a talk group parameter associated with the second device in the second wireless WAN, available network-based applications at the second device in the second wireless WAN, uplink bandwidth of the second device in the second wireless WAN, uplink security capability of the second device in the second wireless WAN, and a WAN signal strength at the second device in the second wireless WAN.

12. The method of claim 11, wherein the advertised system attributes set forth a talk group parameter associated with the second device in the second wireless WAN.

13. The method of claim 11, wherein the advertised system attributes set a priority level of the second device in the second wireless WAN.

14. A system comprising:
a first wireless device configured to use a first wireless wide area network (WAN) technology to access a first WAN;
a plurality of second wireless devices, each configured to use a second wireless WAN technology to access a second WAN; and
a server communicatively coupled to the first wireless device at least in part through the first wireless WAN technology and communicatively coupled to the plurality of second wireless devices at least in part through the second wireless WAN technology;
wherein the server is configured to provide a cryptographic key to the first wireless device and the plurality of second wireless devices;
wherein the second wireless devices are configured to periodically transmit system attribute advertisements using a third wireless technology, where the system attribute advertisements are encrypted with the cryptographic key and where the system attribute advertisements set forth attributes of the respective second wireless device with respect to second wireless device operation using the second wireless WAN technology; and
wherein the first wireless device is further configured to detect a loss of coverage on the first wireless WAN technology, and responsively:
monitor for and receive and decrypt the system attribute advertisements from the second wireless devices;
select a decrypted system attribute advertisement associated with a particular second wireless device best matching attributes needed by the first wireless device; and
establish, using the third wireless technology, an ad hoc connection with the particular second wireless device.

15. The system of claim 14, wherein the third wireless technology comprises a personal area network (PAN) technology common to both the first wireless device and the plurality of second wireless devices.

16. The system of claim 14, wherein the system attribute advertisements are sent via a Wireless Local Area Network beacon, and wherein the at least one second wireless device is configured to advertise the system attributes similarly to an Access Point.

17. The system of claim 16, wherein the system attribute advertisements are provided in Vendor-Specific tags of the Wireless Local Area Network beacon.

18. The system of claim 14, wherein the system attribute advertisements set forth one or more of a system identification of the second wireless WAN, a priority level of the second wireless device in the second wireless WAN, a talk group parameter associated with the second wireless device in the second wireless WAN, available network-based applications at the second wireless device in the second wireless WAN, uplink bandwidth of the second wireless device in the second wireless WAN, uplink security capability of the second wireless device in the second wireless WAN, and a WAN signal strength at the second wireless device in the second wireless WAN.

19. A wireless device comprising:
a first radio configured to operate a first wireless wide area network (WAN) technology to access a first WAN;
a second radio configured to operate a third wireless technology;
a processor communicatively coupled to the first radio and the second radio; and
software stored in memory and comprising instructions executable by the processor, and in response to such execution cause the processor to:
receive a cryptographic key;
detect, via the first radio, a loss of coverage on the first wireless WAN technology and responsively:
monitor for and receive, via the second radio, system attribute advertisements in a plurality of wireless beacons from respective second devices using the third wireless technology, the system attribute advertisements setting forth attributes of the respective second device with respect to second device operation using a second wireless WAN technology to access a second WAN;
decrypt the system attribute advertisements with the cryptographic key; and
select a decrypted system attribute advertisement associated with a particular second device best matching attributes needed by the wireless device, and establish, via the second radio, an ad hoc connection with the particular second device.

20. The wireless device of claim 19, wherein the system attribute advertisements set forth one or more of a system identification of the second wireless WAN, a priority level of the second device in the second wireless WAN, a talk group parameter associated with the second device in the second wireless WAN, available network-based applications at the second device in the second wireless WAN, uplink bandwidth of the second device in the second wireless WAN, uplink security capability of the second device in the second wireless WAN, and a WAN signal strength at the second device in the second wireless WAN.

* * * * *